United States Patent
Sanda

(10) Patent No.: US 10,408,598 B2
(45) Date of Patent: Sep. 10, 2019

(54) PROXIMITY SENSOR

(71) Applicant: OMRON Corporation, Kyoto (JP)

(72) Inventor: Takaaki Sanda, Fukuchiyama (JP)

(73) Assignee: OMRON Corporation, Kyoto (JP)

( * ) Notice: Subject to any disclaimer, the term of this patent is extended or adjusted under 35 U.S.C. 154(b) by 45 days.

(21) Appl. No.: 15/820,453

(22) Filed: Nov. 22, 2017

(65) Prior Publication Data

US 2018/0216926 A1 Aug. 2, 2018

(30) Foreign Application Priority Data

Feb. 1, 2017 (JP) .................................. 2017-016901

(51) Int. Cl.
*G01B 7/02* (2006.01)

(52) U.S. Cl.
CPC .................................. *G01B 7/023* (2013.01)

(58) Field of Classification Search
CPC ...................................................... G01B 7/023
See application file for complete search history.

(56) References Cited

U.S. PATENT DOCUMENTS

| | | | | |
|---|---|---|---|---|
| 6,025,562 A * | 2/2000 | Shimizu | ............... | G01V 3/10 174/17 SF |
| 6,906,527 B1 * | 6/2005 | Niimi | ............... | H01R 13/6683 324/207.15 |
| 7,145,348 B2 * | 12/2006 | Nakazaki | ............... | H03K 17/945 324/627 |
| 7,825,655 B1 * | 11/2010 | Stabel | ............... | G01B 7/14 324/207.15 |
| 8,624,585 B2 * | 1/2014 | Mizusaki | ............... | H03K 17/9505 29/595 |
| 8,932,069 B2 * | 1/2015 | Kim | ............... | H01R 13/73 439/79 |
| 9,239,221 B2 * | 1/2016 | Heimlicher | ............... | H03K 17/9505 |

FOREIGN PATENT DOCUMENTS

| | | |
|---|---|---|
| CN | 102788997 | 11/2012 |
| CN | 103827624 | 5/2014 |
| CN | 103827996 | 5/2014 |
| CN | 204009104 | 12/2014 |
| CN | 105190365 | 12/2015 |
| CN | 105556846 | 5/2016 |
| JP | H09-055153 | 2/1997 |
| JP | 2000208013 A * | 7/2000 |
| JP | 2004-170389 | 6/2004 |
| JP | 2009-048902 | 3/2009 |

OTHER PUBLICATIONS

Office Action of China Counterpart Application, with English translation thereof, dated Apr. 4, 2019, pp. 1-15.

* cited by examiner

*Primary Examiner* — Walter L Lindsay, Jr.
*Assistant Examiner* — Milton Gonzalez
(74) *Attorney, Agent, or Firm* — JCIPRNET

(57) ABSTRACT

The proximity sensor (1) includes a core (3) configured to hold a coil (2), a board (5) on which a proximity detection circuit is mounted, and an intermediate component which is a fixing member (4) formed of a resin to fix the board to the core and has a conductive pattern configured to electrically connect the coil and a wiring provided on the board.

5 Claims, 8 Drawing Sheets

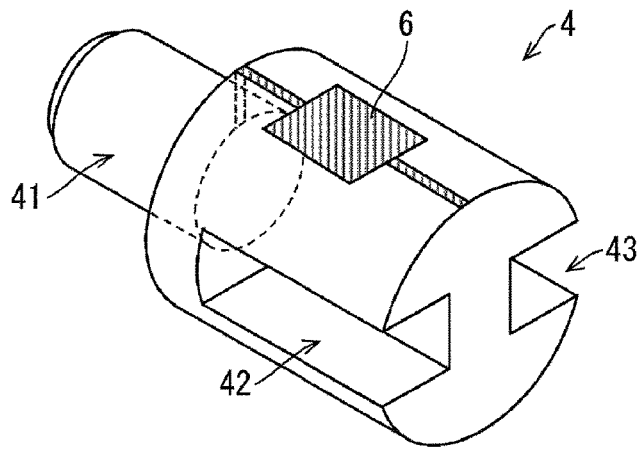
FIG. 3(a)
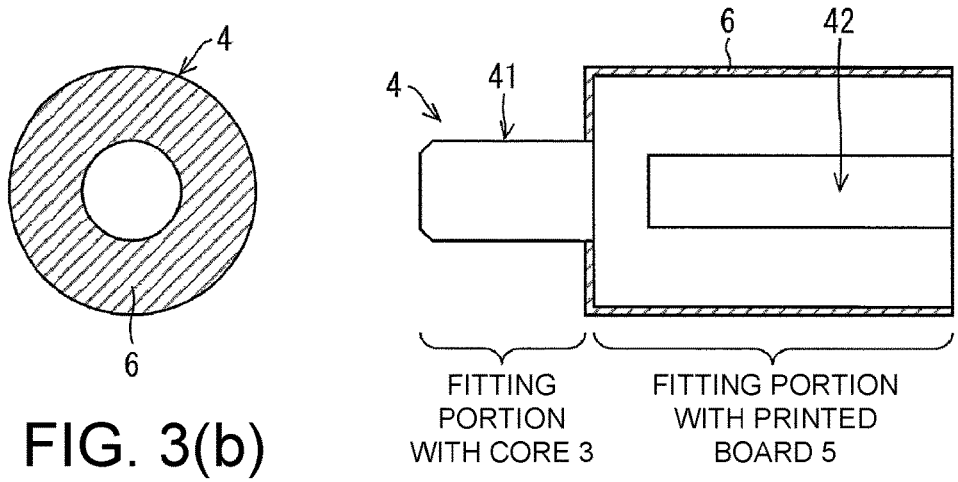
FIG. 3(b)
FIG. 3(c)
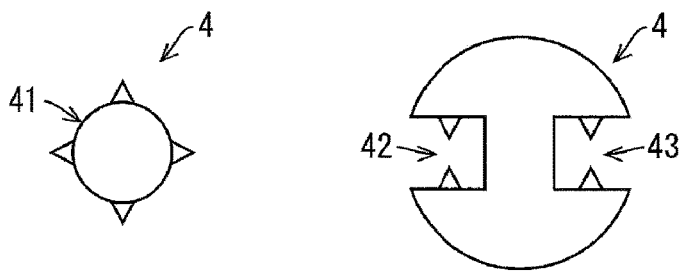
FIG. 3(d)  FIG. 3(e)

(S1) ASSEMBLE CORE AND COIL

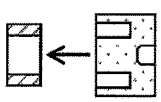

(S2) ATTACH CONDUCTIVE TAPE (DOUBLE-SIDED TAPE) TO TOP SURFACE OF CORE

(S3) PRESS-FIT INTERMEDIATE COMPONENT INTO HOLE OF CORE

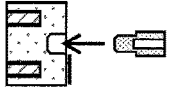

(S4) PRESS-FIT PRINTED BOARD TO INTERMEDIATE COMPONENT

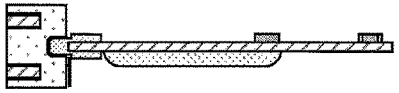

(S5) ATTACH CONDUCTIVE TAPE (DOUBLE-SIDED TAPE) TO INTERMEDIATE COMPONENT AND PRINTED BOARD

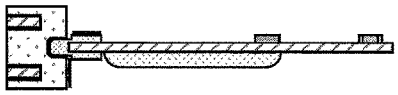

(S6) SOLDER COIL AND PRINTED BOARD

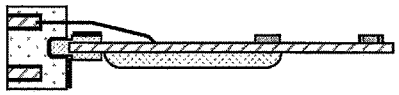

(S7) WIND AND FIX SHIELD FILM

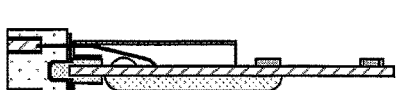

(S8) INJECT PRIMARY RESIN INTO CASE COIL AND MOLD CORE ASSEMBLY

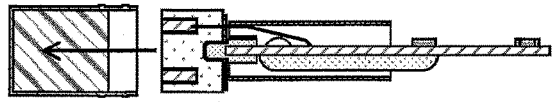

(S9) CURE PRIMARY RESIN

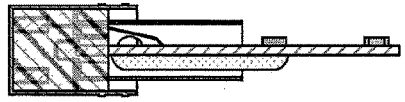

(S10) SOLDER CABLE TO END OF PRINTED BOARD

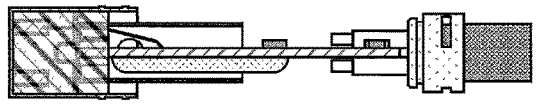

(S11) PRESS-FIT CASING TO PRIMARY ASSEMBLY

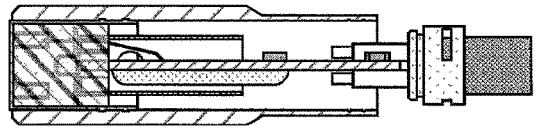

(S12) PRESS-FIT CLAMP

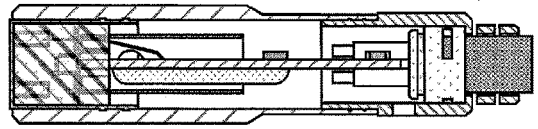

(S13) INJECT SECONDARY RESIN

(S14) CURE SECONDARY RESIN

FIG. 5

PROXIMITY SENSOR

CROSS-REFERENCE TO RELATED APPLICATION

This application claims the priority benefits of Japan Patent Application No. 2017-016901, filed on Feb. 1, 2017. The entirety of the above-mentioned patent application is hereby incorporated by reference herein and made a part of this specification.

BACKGROUND OF THE DISCLOSURE

Field of the Disclosure

The disclosure relates to a proximity sensor.

Description of Related Art

Conventionally, when a board is fixed to a core inside a proximity sensor, positioning is performed by forming a groove in the core and then inserting a protrusion of the board thereinto. For example, in Patent Document 1, there is disclosed a configuration of a proximity sensor in which a protruding portion is provided on a shield film, an electrode is provided at an end of the protruding portion, the protruding portion of the printed board is penetrated by the opening, and a protrusion of a printed board passes through an opening and is engaged with a linear groove of a core.

However, since the core and the board have a large tolerance, assembling accuracy is required, and thus axis alignment in X and Y directions is performed using a high accurate jig. However, a tolerance is also generated in a design of the jig, and thus it is difficult to perform precise axis alignment design.

Accordingly, when the board is fixed to the core inside the proximity sensor, the adjustment for each actual object is increased. As a result, a reduction in yield due to deterioration of the jig over time, a reduction in yield due to mold type update of parts, or the like may occur. That is, it is difficult to stably mass-produce the proximity sensor.

RELATED ART DOCUMENT

Patent Documents

[Patent Document 1] Japanese Unexamined Patent Application Publication No. H09-055153 (published on Feb. 25, 1997)
[Patent Document 2] Japanese Unexamined Patent Application Publication No. 2009-048902 (published on Mar. 5, 2009)
[Patent Document 3] Japanese Unexamined Patent Application Publication No. 2004-170389 (published on Jun. 17, 2004)

SUMMARY OF THE DISCLOSURE

A proximity sensor according to one aspect of the disclosure includes a core configured to hold a coil, a board on which a proximity detection circuit is mounted, and a fixing member formed of a resin to fix the board to the core and having a conductive pattern which electrically connects the coil and a wiring provided on the board.

BRIEF DESCRIPTION OF THE DRAWINGS

FIG. 3(a) to FIG. 3(e) are views illustrating a shape of an intermediate component according to the first embodiment of the disclosure.

FIG. 5 is a view illustrating an assembling process of the proximity sensor according to the first embodiment of the disclosure.

DESCRIPTION OF THE EMBODIMENTS

Figure 1:
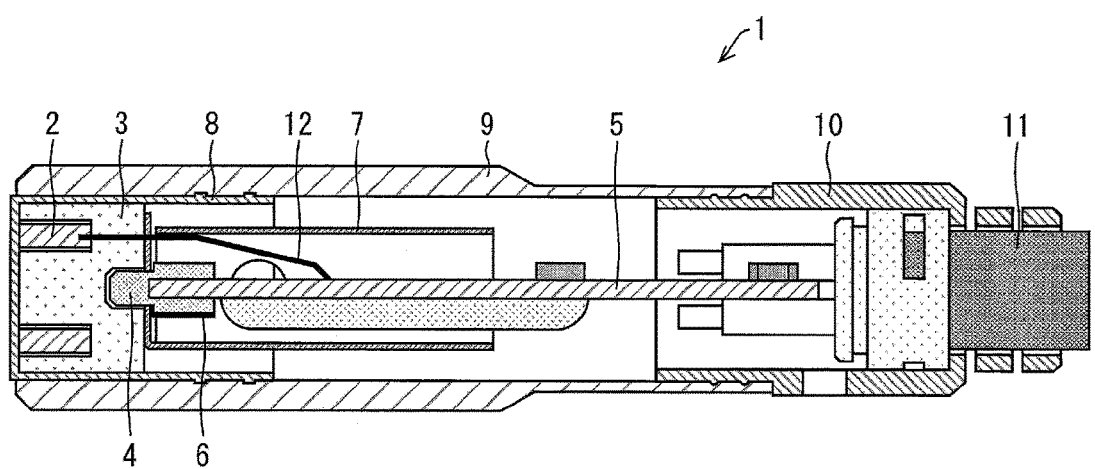
FIG. 1 is a view illustrating a structure of a proximity sensor according to a first embodiment of the disclosure.

Meanwhile, a ground (GND) connection is performed at the time of assembling the core and the board. In order to perform such an electrical connection and also cancel stress applied to the board by a soldering portion at the time of the assembling, there is a technique of fitting a flexible board between the core and the board.

For example, in Patent Document 2, there is disclosed a configuration of a proximity sensor which includes a coil assembly including a core and a detection coil, a first printed board having a processing circuit electrically connected to the detection coil, and a second printed board (corresponding to the flexible board) for relaying an electrical connection between the detection coil and the processing circuit.

However, the flexible board (for example, the second printed board of Patent Document 2) has poor workability at the time of the electrical connection and is a barrier to automation of an assembling process.

Also, in the configurations disclosed in Patent Document 2 and Patent Document 3, the board is fixed by soldering while vertically erected on a bottom surface of the core. In the case of such a configuration, there is a problem that it is difficult to perform the accurate axis design according to accuracy of the jig, as described above. Also, in the case of fixation by the soldering, there is a risk of the board being fixed in a bent state with respect to the bottom surface of the core.

Therefore, one or more exemplary embodiments of the disclosure provide a proximity sensor having good workability at the time of assembling and excellent assembling accuracy.

According to one or more exemplary embodiments, since the fixing member is formed of the resin, design accuracy of the fixing member can be improved. Additionally, since the core and the board are connected via the fixing member having high design accuracy, the board can be accurately fixed to the core. Further, since the fixing member is formed of the resin, handling at the time of assembling is easy, and the risk of the core and the board being fixed in a bent state can be reduced. That is, it is possible to improve workability at the time of the assembling of the proximity sensor and to improve assembling accuracy of the proximity sensor.

In addition, since a conductive pattern is provided on the fixing member, it is possible not to separately provide a wiring for electrically connecting the coil and the board. Therefore, it is possible to simplify a configuration and to facilitate an assembling process.

In the proximity sensor according to one aspect of the disclosure, a connection between the fixing member and the core and a connection between the fixing member and the board may be performed by press-fitting.

According to one or more exemplary embodiments, in the case of the press-fitting, even if there are some errors in the sizes of both members, the fitting can be performed to absorb the errors, and thus the connection and fixing therebetween can be easily realized. The press-fitting can be easily realized when the fixing member is formed of a resin.

In the proximity sensor according to one aspect of the disclosure, a shape of a portion of the core which is press-fitted to the fixing member may be symmetrical with respect to a central axis of the core.

According to one or more exemplary embodiments, in formation of the core, a tolerance of a center position of a shape of a press-fitted portion thereof can be made relatively small. Therefore, a positioning error between the central axis of the core and the central axis of the fixing member can be reduced, and highly accurate axis alignment can be performed.

In the proximity sensor according to one aspect of the disclosure, a hole centered on the central axis of the core may be formed on a surface of the core which is in contact with the fixing member, the board may have an end in which a cut-out portion is formed, and the fixing member may have a protruding portion which is fitted into the hole and a recessed portion which is fitted to the cut-out portion.

According to one or more exemplary embodiments, the fixing of the core and the fixing member and the fixing between the fixing member and the board can be easily and accurately performed.

In the proximity sensor according to one aspect of the disclosure, the conductive pattern may further include a wiring which connects a ground wiring provided on the board and the core.

According to one or more exemplary embodiments, it is possible to easily realize the electrical connection of the board and the core with respect to the ground.

In the proximity sensor according to one aspect of the disclosure, the conductive pattern may further include a wiring which connects a shield wiring disposed on the peripheral of the board and the core.

According to one or more exemplary embodiments, it is possible to easily realize the electrical connection of the shield wiring and the core.

According to one aspect of the disclosure, it is possible to improve the workability at the time of the assembling of the proximity sensor and to improve the assembling accuracy of the proximity sensor.

First Embodiment

Hereinafter, a first embodiment of the disclosure will be described in detail with reference to FIG. 1 to FIG. 5.

FIG. 1 is a view illustrating a structure of a proximity sensor 1 according to a first embodiment of the disclosure. As illustrated in FIG. 1, the proximity sensor 1 includes a coil 2, a core 3, an intermediate component (fixing member) 4, a printed board (board) 5, a circuit pattern (conductive pattern) 6, a shield film 7, a case coil 8, a casing 9, a clamp 10 and a cable 11.

The coil 2 is formed in a circular bundle and generates a magnetic field by being electrically connected to the printed board 5. The core 3 holds the coil 2. The core 3 may be located at a position at which it covers the coil 2. The intermediate component 4 is a fixing member formed of a resin that fixes the printed board 5 to the core 3 and is a fixing member having the circuit pattern 6.

The printed board 5 has a proximity detection circuit and is electrically connected with the coil 2 to conduct electricity. The circuit pattern 6 is provided on the intermediate component 4 and electrically connects the coil 2 and a wiring provided on the printed board 5. The circuit pattern 6 further includes a wiring which connects a ground wiring provided on the printed board 5 and the core 3. The circuit pattern 6 further includes a wiring which connects a shield wiring disposed on the peripheral of the printed board 5 and the core 3.

In the shield film 7, a land at a tip end thereof is fixed and connected to a land of the intermediate component 4 via a conductive tape or a conductive adhesive. The shield film 7 is wound around the printed board 5 to prevent noise from entering from the outside. The case coil 8 is a cylindrical case which accommodates the coil 2, the core 3, the printed board 5 and the shield film 7. The case coil 8 protects the coil 2 and the core 3 from an external force.

The casing 9 is disposed outside the case coil 8. The casing 9 is a cylindrical case, and a screw tap for installation at a facility is formed thereon. The clamp 10 is a member formed of a resin and holds the cable 11.

Further, as illustrated in FIG. 1, the coil 2 and the land of the printed board 5 are connected to each other by a solder 12 to be electrically conductive.

Figure 2A:
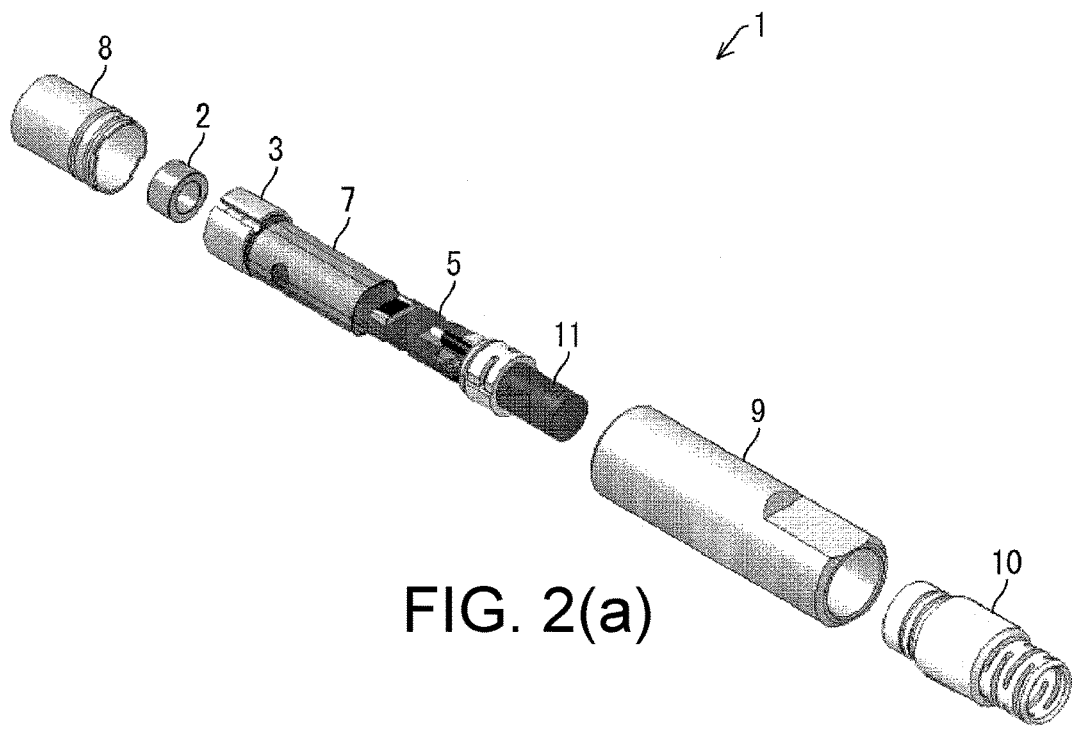
FIG. 2(a) and FIG. 2(b) are views illustrating a component configuration of the proximity sensor according to the first embodiment of the disclosure.
Figure 2B:
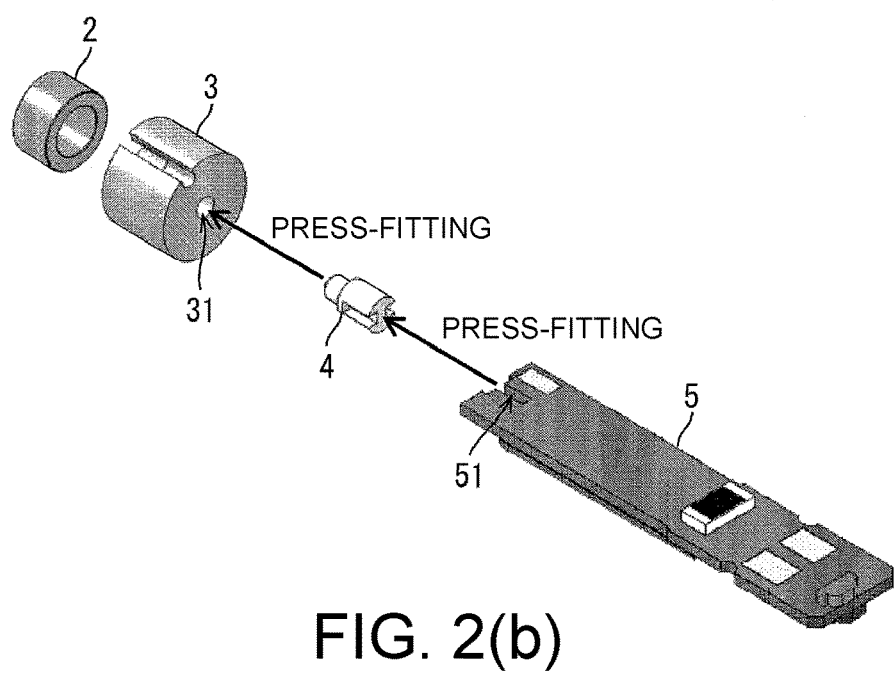

FIG. 2(a) and FIG. 2(b) are views illustrating a component configuration of the proximity sensor 1 according to the present embodiment. FIG. 2(a) illustrates the component configuration of the entire proximity sensor 1. FIG. 3(b) illustrates a configuration of the components of the proximity sensor 1 from the coil 2 to the printed board 5.

As illustrated in FIG. 2(a), the proximity sensor 1 is divided into the case coil 8, the coil 2, the core 3, the shield film 7, the printed board 5, the cable 11, the casing 9 and the clamp 10. As illustrated in FIG. 2(b), the proximity sensor 1 also includes, as components, the coil 2, the core 3, the intermediate component 4 and the printed board 5.

As illustrated in FIG. 2(b), fixing of the core 3 and the intermediate component 4 and fixing of the intermediate component 4 and the printed board 5 are performed by press-fitting. In the core 3, a shape of a portion thereof press-fitted to the intermediate component 4 is symmetrical with respect to a central axis of the core 3. A hole 31 centered on the central axis of the core 3 is formed in a surface of the core 3 which is in contact with the intermediate component 4. As an example, a circular hole 31 is provided at a center of a flat surface of the core 3. An end of the printed board 5 has a cut-out portion 51.

The core 3 and the printed board 5 are designed with reference to their respective central axes. Accordingly, when the core 3 and the printed board 5 are fixed, there is almost no misalignment between the central axes thereof. The fixing of the core 3 and the intermediate component 4 is carried out using press-fitting, a conductive tape or a conductive adhesive. The fixing of the intermediate component 4 and the printed board 5 is carried out using press-fitting, soldering, a conductive tape or a conductive adhesive.

FIG. 3(a) to FIG. 3(e) are views illustrating a shape of the intermediate component 4 according to the embodiment. FIG. 3(a) is a perspective view of the intermediate component 4. FIG. 3(b) is a front view of the intermediate component 4. FIG. 3(c) is a side view of the intermediate component 4. FIG. 3(d) is a view illustrating a fitting portion between the intermediate component 4 and the core 3. FIG. 3(e) is a view illustrating a fitting portion between the intermediate component 4 and the printed board 5.

As illustrated in FIG. 3(a) and FIG. 3(c), the intermediate component 4 has a protruding portion 41 which is fitted into the hole 31 and recessed portions 42 and 43 which are fitted to the cut-out portion 51.

As illustrated in FIG. 3(d) and FIG. 3(e), the protruding portion 41 of the intermediate component 4 and the recessed portions 42 and 43 have ribs formed of a resin. By the ribs, a central axis alignment can be more reliably realized when the printed board 5 is fixed to the core 3.

Figure 4A:
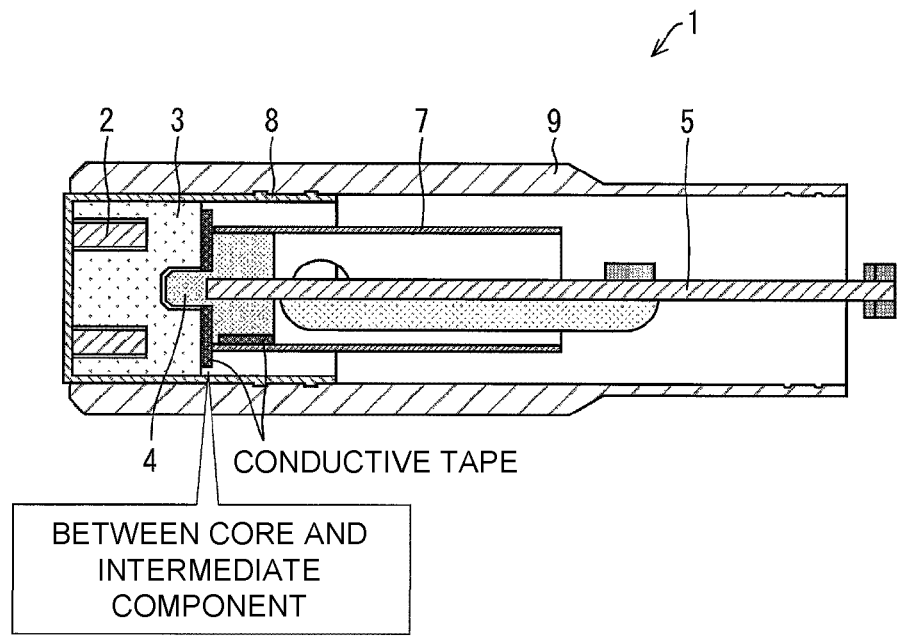
FIG. 4(a) and FIG. 4(b) are views illustrating an electrical connection in the proximity sensor according to the first embodiment of the disclosure.
Figure 4B:
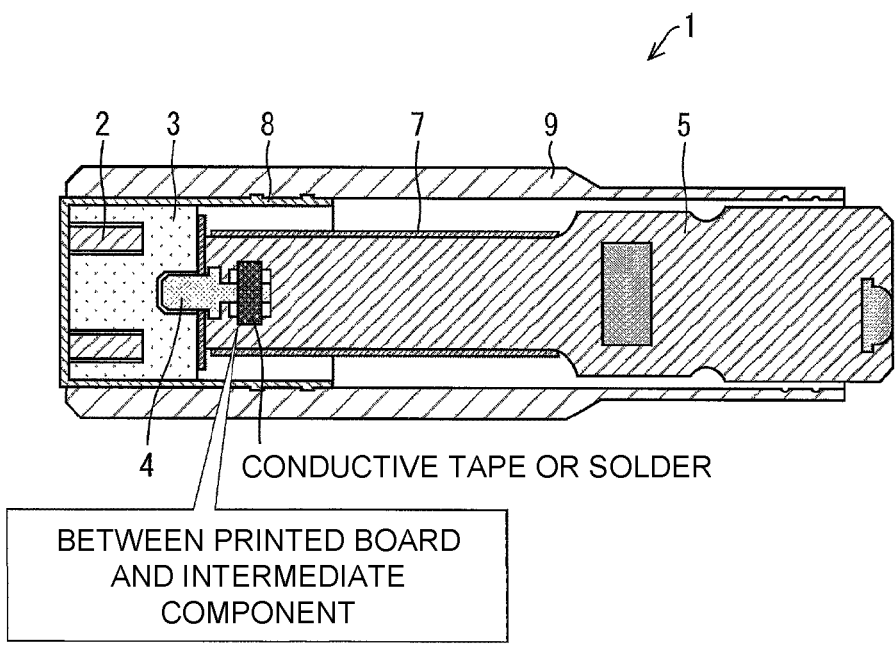

FIG. 4(a) and FIG. 4(b) are views illustrating an electrical connection in the proximity sensor 1 according to the embodiment. FIG. 4(a) is a view illustrating the electrical connection between the core 3 and the intermediate component 4. FIG. 4(b) is a view illustrating the electrical connection between the printed board 5 and the intermediate component 4.

The core 3 and the printed board 5 are electrically connected to each other through the intermediate component 4 by fitting the intermediate component 4 having the ground circuit on a resin surface thereof to the core 3 and the printed board 5. As illustrated in FIG. 4(a), the core 3 and the intermediate component 4 are electrically connected with each other by the conductive tape or the conductive adhesive. As illustrated in FIG. 4(b), the printed board 5 and the intermediate component 4 are electrically connected with each other by the conductive tape, the conductive adhesive or the solder.

FIG. 5 is a view illustrating an assembling process of the proximity sensor 1 according to the embodiment.

(Step S1)
The core 3 and the coil 2 are assembled.
(Step S2)
The conductive tape is attached on a top surface of the core 3. An electric conductor may be attached with a double-sided tape, or the conductive adhesive may be used.
(Step S3)
The protruding portion 41 of the intermediate component 4 is press-fitted into the hole 31 of the core 3.
(Step S4)
The printed board 5 is press-fitted to the intermediate component 4.
(Step S5)
The conductive tape is attached to the intermediate component 4 and the printed board 5. The conductor may be attached with the double-sided tape, or the conductive adhesive may be used.
(Step S6)
The coil 2 and the printed board 5 are soldered.
(Step S7)
The shield film 7 is wound around the printed board 5 and fixed thereto.
(Step S8)
A primary resin is put in the case coil 8, and a core assembly is press-fitted therein.
(Step S9)
The primary resin is cured.
(Step S10)
The cable 11 is soldered to an end of the printed board 5.
(Step S11)
The casing 9 is pressed-fitted into the primary assembly.
(Step S12)
The clamp 10 is press-fitted.
(Step S13)
A secondary resin is injected.
(Step S14)
The secondary resin is cured.

Further, the order of step S3, step S4 and step S5 may be changed. Step S6 may be performed after step S4. The order of step S10 and step S11 may be changed.

According to the above-described configuration, since the intermediate component 4 is formed of the resin, design accuracy of the intermediate component 4 can be improved. Additionally, since the core 3 and the printed board 5 are connected via the intermediate component 4 having high design accuracy, the printed board 5 can be accurately fixed to the core 3. Further, since the intermediate component 4 is formed of the resin, handling at the time of assembling is easy, and the risk of the core 3 and the printed board 5 being fixed in a bent state can be reduced. That is, it is possible to improve workability at the time of the assembling of the proximity sensor 1 and to improve assembling accuracy of the proximity sensor 1.

In addition, since the circuit pattern 6 is provided on the intermediate component 4, it is possible not to separately provide a wiring for electrically connecting the coil 2 and the printed board 5. Therefore, it is possible to simplify the configuration and to facilitate the assembling process.

Next, in the case of the press-fitting, even if there are some errors in sizes of the core 3 and the printed board 5, the fitting can be performed to absorb the errors, and thus the connection and fixing between the core 3 and the printed board 5 can be easily realized. The press-fitting can be easily realized when the intermediate component 4 is formed of a resin. Further, in the formation of the core 3, a tolerance of a center position of a shape of a press-fitted portion thereof can be made relatively small. Therefore, a positioning error between the central axis of the core 3 and the central axis of the intermediate component 4 can be reduced, and highly accurate axis alignment can be performed.

Further, according to the above-described configuration, it is possible to easily and accurately realize the fixing of the core 3 and the intermediate component 4 and the fixing of the intermediate component 4 and the printed board 5. Next, the electrical connection of the printed board 5 and the core 3 with respect to the ground can be easily realized. Also, the electrical connection between the shield wiring and the core 3 can be easily realized.

Second Embodiment

A second embodiment of the disclosure will be described below with reference to FIG. 6. Further, for convenience of explanation, members having the same functions as the members described in the above embodiment are denoted by the same reference numerals, and description thereof will be omitted.

Figure 6:
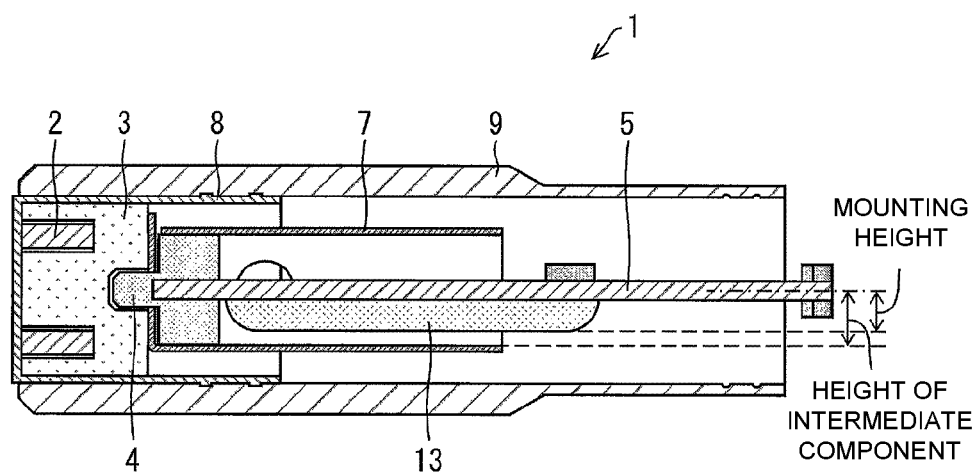
FIG. 6 is a view illustrating a structure of a proximity sensor according to a second embodiment of the disclosure.

FIG. 6 is a view illustrating a structure of a proximity sensor 1 according to the embodiment. As illustrated in FIG. 6, a component 13 is mounted under the printed board 5. A mounting height is a vertical distance from a center line of the printed board 5 to an uppermost point of the component 13. A height of the intermediate component 4 is a vertical distance from the center line of the printed board 5 (that is, a center line of the intermediate component 4) to a circumference of the intermediate component 4. As illustrated in FIG. 6, the height of the intermediate component 4 is greater than the mounting height.

According to the above-described configuration, since the height of the intermediate component 4 is greater than the mounting height, there is no interference when the shield film 7 is wound around the printed board 5, and thus a deviation in the assembling can be suppressed.

Third Embodiment

A third embodiment of the disclosure will be described below with reference to FIG. 7. Further, for convenience of explanation, members having the same functions as the members described in the above embodiments are denoted by the same reference numerals, and description thereof will be omitted.

Figure 7:
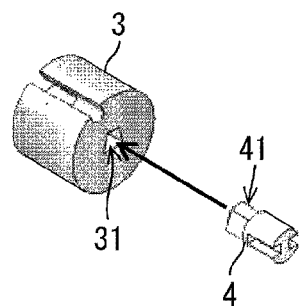
FIG. 7 is a view illustrating shapes of a core and an intermediate component according to a third embodiment of the disclosure.

FIG. 7 is a view illustrating the shapes of the core 3 and the intermediate component 4 according to the embodiment. As illustrated in FIG. 7, each of the hole 31 of the core 3 and the protruding portion 41 of the intermediate component 4 has a trapezoidal shape. The hole 31 and the protruding portion 41 are not limited to the trapezoidal shapes but may have polygonal shapes or elliptical shapes.

According to the above-described configuration, since the fitting portion between the core 3 and the intermediate component 4 has a polygonal or elliptical shape, positioning in a rotational direction with respect to the core 3 and the printed board 5 is possible.

Fourth Embodiment

A fourth embodiment of the disclosure will be described below with reference to FIG. 8(*a*) and FIG. 8(*b*). Further, for convenience of explanation, members having the same functions as the members described in the above embodiments are denoted by the same reference numerals, and description thereof will be omitted.

Figure 8A:
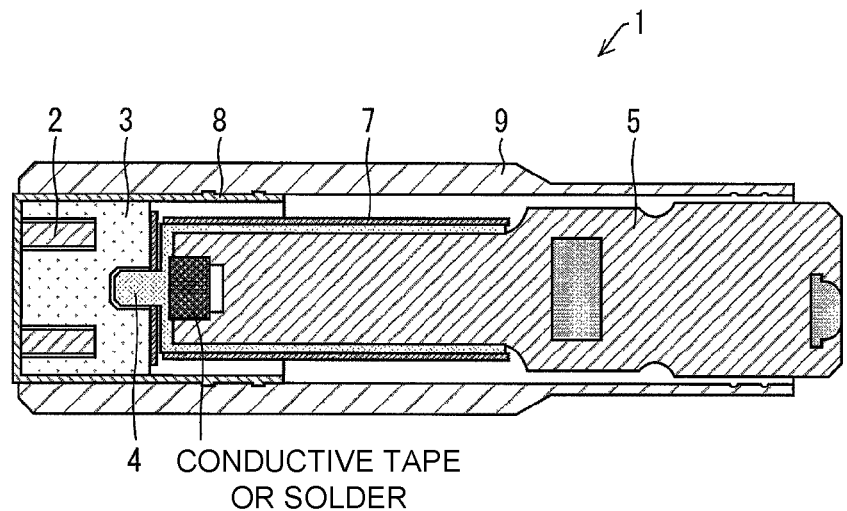
FIG. 8(a) and FIG. 8(b) are views illustrating a structure of a proximity sensor according to a fourth embodiment of the disclosure.
Figure 8B:
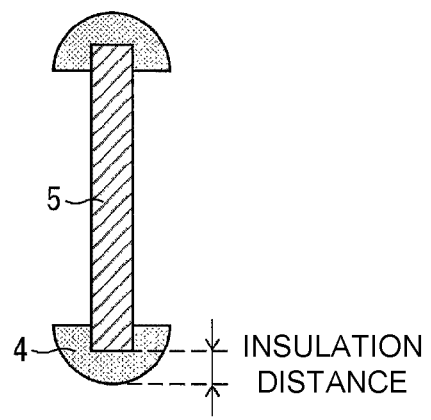

FIG. 8(*a*) and FIG. 8(*b*) are views illustrating a structure of a proximity sensor 1 according to the embodiment. FIG. 8(*a*) illustrates a position of the conductive tape, the conductive adhesive or the solder. FIG. 8(*b*) illustrates an insulation distance of a resin member.

As illustrated in FIG. 8(*a*), the electrical connection between the intermediate component 4 and the printed board 5 can be performed at an arbitrary location. For example, the electrical connection may be performed at a center of a tip end of the printed board 5 using the conductive tape, the conductive adhesive or the solder.

As illustrated in FIG. 8(*b*), the printed board 5 is fixed by holding both side surfaces of the printed board 5 with the resin member. Further, the resin member having a predetermined size is provided on a side surface of the printed board 5. The printed board 5 is covered with a shield film 7 and further covered with a metallic casing 9.

According to the above-described configuration, since the insulation distance of the resin member is secured between the side surface of the printed board 5 and the metallic casing 9 covering the printed board 5, withstand voltage performance can be improved, and thus an internal resin can be unnecessary.

Fifth Embodiment

A fifth embodiment of the disclosure will be described below with reference to FIG. 9. Further, for convenience of explanation, members having the same functions as the members described in the above embodiments are denoted by the same reference numerals, and description thereof will be omitted.

Figure 9:
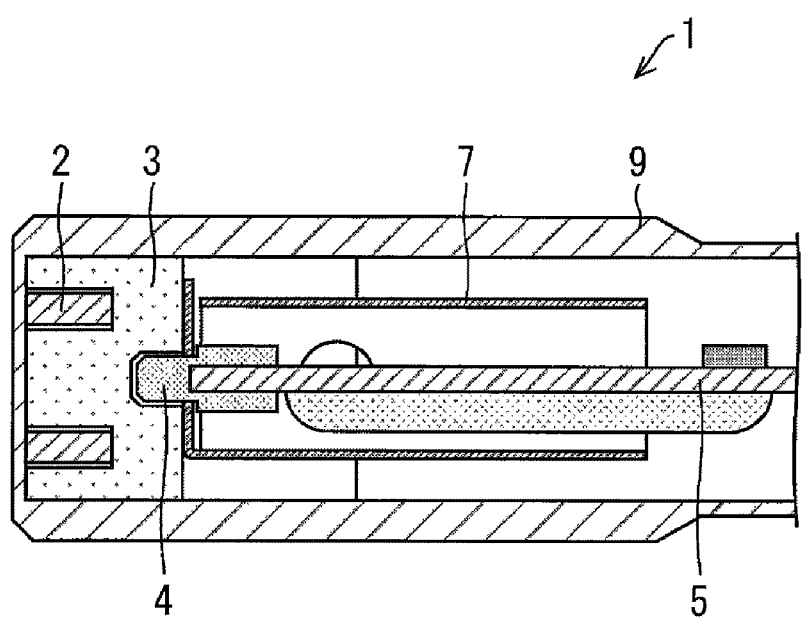
FIG. 9 is a view illustrating a structure of a proximity sensor according to a fifth embodiment of the disclosure.

FIG. 9 is a view illustrating a structure of a proximity sensor 1 according to the embodiment. As illustrated in FIG. 9, there is no description of the case coil 8, and the case coil is integrated with the casing 9.

In this case, Steps S8 to S10 of FIG. 5 are performed in the casing 9.

The disclosure is not limited to the above-described embodiments, but various modifications are possible within the scope indicated in the claims, and embodiments obtained by appropriately combining technical means disclosed in different embodiments are also included in the technical scope of the disclosure.

What is claimed is:

1. A proximity sensor comprising:
    a core configured to hold a coil;
    a board on which a proximity detection circuit is mounted; and
    a fixing member formed of a resin to fix the board with respect to the core and having a conductive pattern which electrically connects the coil and a wiring provided on the board, wherein a hole centered on a central axis of the core is formed on a surface of the core which is in contact with the fixing member,
    the board has an end in which a cut-out portion is formed, and
    the fixing member has a protruding portion which is fitted into the hole and a recessed portion which is fitted to the cut-out portion, wherein the protruding portion and the recessed portion have ribs formed of a resin so as to facilitate a central axis alignment when the board is fixed to the core,
    wherein a component is mounted on a surface of the board in which a height of the fixing member is greater than a mounting height of the component, the height of the fixing member is a vertical distance from a center line of the board to a circumference of the fixing member, and the mounting height of the component is a vertical distance from the center line of the board to an uppermost point of the component.

2. The proximity sensor according to claim 1, wherein a connection between the fixing member and the core and a connection between the fixing member and the board are performed by press-fitting.

3. The proximity sensor according to claim 2, wherein a shape of a portion of the core which is press-fitted to the fixing member is symmetrical with respect to a central axis of the core.

4. The proximity sensor according to claim 1, wherein the conductive pattern further includes a wiring which connects a ground wiring provided on the board and the core.

5. The proximity sensor according to claim 1, wherein the conductive pattern further includes a wiring which connects a shield wiring disposed on a peripheral of the board and the core.

* * * * *